United States Patent
Kimpel et al.

(10) Patent No.: US 10,844,229 B2
(45) Date of Patent: Nov. 24, 2020

(54) RADIATION-CURABLE COMPOUNDS CONTAINING POLYESTER ACRYLATE

(71) Applicant: BASF SE, Ludwigshafen am Rhein (DE)

(72) Inventors: Delphine Kimpel, Ludwigshafen (DE); Kenneth Shaun Tranter, Ludwigshafen (DE); Daniel Kunz, Ludwigshafen (DE); Kathrin Cohen, Ludwigshafen (DE); Peter Thuery, Ludwigshafen (DE); Christine Roesch, Ludwigshafen (DE); Stefan Wahl, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/341,196

(22) PCT Filed: Oct. 2, 2017

(86) PCT No.: PCT/EP2017/074935
§ 371 (c)(1),
(2) Date: Apr. 11, 2019

(87) PCT Pub. No.: WO2018/069075
PCT Pub. Date: Apr. 19, 2018

(65) Prior Publication Data
US 2019/0233655 A1    Aug. 1, 2019

(30) Foreign Application Priority Data
Oct. 13, 2016 (EP) .................................... 16193688

(51) Int. Cl.
| C08F 2/46 | (2006.01) |
| C08F 2/50 | (2006.01) |
| C08G 61/04 | (2006.01) |
| C09D 4/06 | (2006.01) |
| C09D 167/06 | (2006.01) |
| C08G 63/47 | (2006.01) |
| C08G 63/91 | (2006.01) |
| C09D 151/08 | (2006.01) |
| C08F 290/06 | (2006.01) |
| C08J 7/04 | (2020.01) |

(52) U.S. Cl.
CPC ............ *C09D 4/06* (2013.01); *C08F 290/061* (2013.01); *C08G 63/47* (2013.01); *C08G 63/914* (2013.01); *C08J 7/0427* (2020.01); *C09D 151/08* (2013.01); *C09D 167/06* (2013.01); *C08J 2327/06* (2013.01); *C08J 2397/00* (2013.01); *C08J 2467/06* (2013.01)

(58) Field of Classification Search
CPC ...... C09D 4/06; C09D 167/06; C09D 151/08; C08F 290/061; C08F 222/102; C08F 222/1006; C08J 7/047; C08J 7/0427; C08J 2467/06; C08J 2397/00; C08J 2327/06; C08G 63/47
USPC ................................. 522/107, 104, 1; 520/1
See application file for complete search history.

(56) References Cited

U.S. PATENT DOCUMENTS

| 2009/0082485 A1* | 3/2009 | Slark .................... C09D 175/16 522/153 |
| 2011/0287274 A1* | 11/2011 | Mijolovic ............... C07C 69/54 428/521 |
| 2017/0335047 A1 | 11/2017 | Cohen et al. |
| 2017/0335058 A1 | 11/2017 | Cohen et al. |
| 2018/0244948 A1 | 8/2018 | Berger et al. |
| 2019/0010274 A1 | 1/2019 | Tomovic et al. |
| 2019/0112500 A1 | 4/2019 | Berger et al. |

FOREIGN PATENT DOCUMENTS

| DE | 3836370 A1 | 5/1990 |
| EP | 0126341 B1 | 2/1989 |
| WO | 2017085158 A1 | 5/2017 |
| WO | 2017174438 A1 | 10/2017 |

OTHER PUBLICATIONS

English translation of International Search Report for International Application No. PCT/EP2017/074935, dated Dec. 6, 2017, 2 pages.
European Search Report for EP Patent Application No. 16193688.5, dated Mar. 23, 2017, 3 pages.

* cited by examiner

*Primary Examiner* — Jessica Whiteley
(74) *Attorney, Agent, or Firm* — Armstrong Teasdale LLP

(57) ABSTRACT

Radiation-curable, polyester acrylate-containing compositions (I) obtainable by reacting 0.5 to 20 mol % of a polyester polyol (A) and 0.5 to 30 mol % of a polyester diol (B) with 1 to 10 mol % of phthalic anhydride (C) and 65 to 75 mol % of (meth)acrylic acid (D) in the presence of an acidic esterification catalyst, a hydrocarbon (L), and a polymerization inhibitor. Reaction temperatures range from 60 to 140° C. The hydrocarbon (L) functions as solvent, forms an azeotropic mixture with water, and is removed distillatively after esterification. Water formed in the reaction is removed azeotropically. After neutralization of the esterification catalyst, free (meth)acrylic acid is reacted with an epoxide compound (E) in an amount equivalent to the acid number of the reaction mixture. The compound (E) has at least two epoxide groups per molecule. The compositions are suitable for coating the surfaces of solid substrates.

10 Claims, No Drawings

RADIATION-CURABLE COMPOUNDS CONTAINING POLYESTER ACRYLATE

CROSS-REFERENCE TO RELATED APPLICATIONS

This application is a U.S. National Phase Application of PCT/EP2017/074935, filed Oct. 2, 2017, which claims the benefit of priority to EP Application No. 16193688.5, filed Oct. 13, 2016, the contents of which are hereby expressly incorporated by reference in their entirety.

FIELD OF THE INVENTION

The present invention concerns polyester acrylate-containing compositions and use thereof for producing radiation-curable coating compounds, particularly for PVC coatings.

EP-B-126,341 describes a process for preparing esters of (meth)acrylic acid with hydroxyl-containing organic compounds by esterifying saturated polyesters which optionally comprise ether groups and comprise at least 2 free hydroxyl groups (OH groups) per molecule or polyethers which comprise at least 2 free hydroxyl groups (OH groups) per molecule, these polyesters or polyethers having average molecular weights Mn of between 400 and 4000 g/mol, with 100 to 150 mol %, based on the OH groups of the polyester or polyether, of acrylic acid or methacrylic acid in the presence of an acidic esterification catalyst and of at least one hydrocarbon which forms an azeotropic mixture with water, and also of small amounts of a polymerization inhibitor, with azeotropic removal of the water formed in the esterification, at elevated temperature; after the esterification, removing the hydrocarbon distillatively; and, after neutralization of the esterification catalyst, reacting the remaining acrylic or methacrylic acid with an epoxide compound in an amount equivalent to the acid number, this epoxide compound having at least two epoxide groups per molecule, reaction continuing down to an acid number of 5 mg KOH/g or less.

DESCRIPTION OF THE INVENTION

Bisphenol A-based polyester acrylates have long been used for radiation-curing coatings. There have since been signs that bisphenol A has hormonelike effects, and so for reasons simply of prevention there is increasingly a tendency to develop alternatives free from bisphenol A. Coatings based on such alternatives are to be distinguished nevertheless by good mechanical proper-ties and also good chemical resistance.

It was an object of the present invention to provide new, bisphenol A-free, polyester acrylate-containing compositions which are suitable for the coating of surfaces of solid substrates and particularly plastics—especially preferably PVC—where the coating is cured by radiation curing, particularly with UV light.

A first subject of the present invention are radiation-curable, polyester acrylate-containing compositions (I) obtainable by reacting 0.5 to 20 mol % of at least one polyester polyol (A), prepared by reaction of the reactants adipic acid, phthalic anhydride, oleic acid and trimethylolpropane, where the polyester polyol has an OH functionality in the range from 3.0 to 3.9, and 0.5 to 30 mol % of at least one polyester diol (B), prepared by reaction of the reactants adipic acid, isophthalic acid, and 2-butyl-2-ethyl-1,3-propanediol, in the presence of an acidic esterification catalyst and in the presence of at least one hydrocarbon (L) which functions as solvent and forms an azeotropic mixture with water, and also in the presence of at least one polymerization inhibitor, with azeotropic removal of water formed in the reaction, at temperatures in the range from 60 to 140° C., with 1 to 10 mol % of phthalic anhydride (C) and 65 to 75 mol % of (meth)acrylic acid (D)

in an esterification removing the hydrocarbon (L) distillatively after the esterification, and, after neutralization of the esterification catalyst, reacting free (meth)acrylic acid with an epoxide compound (E) in an amount equivalent to the acid number of the reaction mixture, the compound (E) having at least two epoxide groups per molecule, reaction taking place to an acid number of 5 or fewer mg KOH/g, subject to the following provisos:

the mol % figures are based on the total amount of the compounds (A), (B), (C) and (D) used for the reaction;

the molar ratio of the compounds (A) and (B) is in the range from 10:1 to 1:40.

The concept of the OH functionality is familiar to the skilled person. It indicates the number of OH groups (hydroxyl groups) that are present on average per molecule. Pure diols, such as the compounds (B), for instance, have an OH functionality of 2.0.

The process according to the invention comprises, accordingly, the following three steps:

1. The reaction of at least one polyester polyol (A) and at least one polyester diol (B) with phthalic anhydride (C) and (meth)acrylic acid (D) in an esterification, where the reaction is carried out in a hydrocarbon that forms an azeotrope with water, in the presence of an acidic esterification catalyst and of at least one polymerization inhibitor, with azeotropic removal of the water of reaction formed.
2. The removal of the hydrocarbon along with the neutralization of the esterification catalyst.
3. The reaction of excess (meth)acrylic acid with an epoxide compound (E) in an amount equivalent to the acid number of the reaction mixture, said compound (E) having at least two epoxide groups per molecule, the reaction continuing down to an acid number of 5 or fewer mg KOH/g, this being subject to the provisos stated above.

A further subject of the invention concerns radiation-curable compositions (II) comprising 60 to 100 wt % of a polyester acrylate-containing composition (I) and 0 to 40 wt % of dipropylene glycol diacrylate (F)—wt % based in each case on the overall radiation-curable composition (II).

A further subject of the invention concerns coating compounds comprising one or more compositions (I).

A further subject of the invention concerns coating compounds comprising one or more compositions (II).

The Compounds (A)

The polyester polyols (A) are prepared by reaction of the reactants adipic acid, phthalic anhydride, oleic acid, and trimethylolpropane, and have an OH functionality in the range from 3.0 to 3.9. Preferably the OH functionality is 3.6 to 3.8 and more particularly 3.7. The OHN (hydroxyl number) of the compounds (A) is preferably in the range from 365 to 400 mg KOH/g. The mean molar weight of the compounds (A) is preferably in the range from 500 to 600 g/mol.

In the preparation of the compounds (A), the reactants are used preferably in the following amounts: 10 to 20 mol % of adipic acid, 15 to 30 mol % of phthalic anhydride, 2 to 20 mol % of oleic acid, and 50 to 70 mol % of trimethylolpropane.

The compounds (A) are used in the esterification in an amount of 0.5 to 20 mol % and preferably 5 to 15 mol %.

The Compounds (B)

The polyester diols (B) are prepared by reaction of the reactants adipic acid, isophthalic acid, and 2-butyl-2-ethyl-1,3-propanediol.

The OHN (hydroxyl number) of the compounds (B) is preferably in the range from 100 to 300 mg KOH/g. The mean molar weight of the compounds (B) is preferably in the range from 370 to 1120 g/mol.

In the preparation of the compounds (B), the reactants are used preferably in the following amounts: 15 to 20 mol % of adipic acid, 15 to 20 mol % of isophthalic acid, and 60 to 70 mol % of 2-butyl-2-ethyl-1,3-propanediol.

Particular preference is given to using the reactants adipic acid, isophthalic acid, and 2-butyl-2-ethyl-1,3-propanediol in a molar ratio of 1:1:2.7.

One embodiment uses the reactants in the following amounts: 21 mol % of adipic acid, 21 mol % of isophthalic acid, 58 mol % of 2-butyl-2-ethyl-1,3-propanediol.

The compounds (B) are used in the esterification in an amount of 0.5 to 30 mol % and preferably 5 to 20 mol %.

Ratio of the Compounds (A) and (B) in the Esterification

The molar ratio of the compounds (A) and (B) is set to a value in the range from 10:1 to 1:40 and more particularly 3:1 to 1:3.

The Compound (C)

The compound (C) comprises phthalic anhydride. The compound (C) is used in the esterification in an amount of 1 to 10 mol % and preferably 3 to 7 mol %.

The Compounds (D)

The compounds (D) comprise (meth)acrylic acid. This means that either acrylic acid or methacrylic acid, or mixtures of acrylic and methacrylic acids, may be used. The compounds (D) are used in the esterification in an amount of 65 to 75 mol %.

The Compounds (E)

The compounds (E) are epoxide compounds which have at least two epoxide groups per molecule. Particularly preferred compounds (E) are as follows: 1,4-butanediol diglycidyl ether, pentaerythritol triglycidyl ether, 1,6-hexanediol diglycidyl ether, trimethylolpropane triglycidyl ether, cyclohexanedimethanol diglycidyl ether, glycerol triglycidyl ether, polytetrahydrofuran diglycidyl ether, polypropylene glycol diglycidyl ether.

The Compound (F)

The compound (F) comprises dipropylene glycol diacrylate. As observed above, the compounds (F) are present in the compositions (II). In this context it may be noted that the compositions (II) may be produced by metering the compound (F) into a composition (I). It is, however, also possible to meter in the compounds (F) as early as during the production of the compositions (I), in one of the three steps 1, 2 or 3 described below.

Step 1 of the Process

The compounds (A) and (B) are reacted with the compounds (C) and (D) in the presence of an acidic esterification catalyst, and also in the presence of a hydrocarbon which forms an azeotropic mixture with water, preferably to a conversion (degree of esterification) of at least 85%—and more particularly 90 to 95%.

Esterification catalysts used are preferably sulfuric acid, methanesulfonic acid or p-toluenesulfonic acid. The reaction temperature of the esterification is set to a value in the range from 60 to 140° C. and more particularly 90 to 110° C.

The water of reaction formed is removed azeotropically. Entraining agents used are hydrocarbons that are able to form an azeotrope with water. In this context it is possible to use aliphatic and aromatic hydrocarbons. Examples of such are as follows: alkanes and cycloalkanes, such as n-hexane, n-heptane, n-octane, isooctane, cyclohexane, and methylcyclohexane, aromatics such as benzene, toluene, and xylene isomers, and additionally what are known as special boiling point spirits, having boiling limits between 60 and 140° C.

To prevent a premature polymerization, the esterification is conducted in the presence of small amounts of a polymerization inhibitor. The chemical nature of the polymerization inhibitor is not subject per se to any particular limitations. Preference is given to using the compounds known in this context to the skilled person for preventing a thermal polymerization, examples being hydroquinone, hydroquinone monoalkyl ethers, 2,6-di-tert-butylphenol, N-nitrosoamines, phenothiazines, or phosphorous esters. They are used preferably in amounts of 0.001 to 2.0 wt % and more particularly in amounts of 0.005 to 0.5 wt %—based on the sum of the compounds (P1), (P2), and (meth)acrylic acid.

Step 2 of the Process

Following step 1, the hydrocarbon used is removed from the reaction mixture distillatively, optionally under reduced pressure. Present at the end of step 2 is a crude ester which, because of the residual quantities of acrylic and/or methacrylic acid it comprises, has an acid number (AN) of x mg KOH/g. This acid number x is reduced in the third step of the process according to the invention, described below, to a value y of 5 mg KOH/g or less.

Following removal of the hydrocarbon, the esterification catalyst used is neutralized.

Step 3 of the Process

In the third step of the process according to the invention, the crude ester present at the end of step 2, which because of the residual amounts of acrylic and/or methacrylic acid it comprises has an acid number (AN) of x mg KOH/g, x denoting an acid number of 20 mg KOH/g or higher, is reacted with an epoxide compound (E) in an amount equivalent to the acid number of the reaction mixture, said compound (E) comprising at least two epoxide groups per molecule.

The reaction in step 3 is preferably taken to a point where an acid number y of 5 mg KOH/g or less is reached.

In one embodiment the amount of the compound (E) used is the amount required arithmetically in order to lower the acid number x of the crude ester to a value of 0 mg KOH/g. This means that the compound (E) is used in an amount equivalent to the acid number x of the crude ester.

Use

A further subject of the invention is the use of the compositions (I) to coat the surfaces of solid substrates. The term "solid" here refers to the aggregate state of the substrate. There is no restriction on the nature of the substrate per se. Examples of suitable substrates are, for example, textile, leather, metal, plastic, cork, glass, wood, paper or card. In one particularly preferred embodiment the substrates comprise plastics, particularly PVC. In another preferred embodiment, the substrates comprise cork.

A further subject of the invention is the use of the compositions (II) to coat the surfaces of solid substrates. There is no restriction on the nature of the substrate per se.

Examples of suitable substrates are, for example, textile, leather, metal, plastic, cork, glass, wood, paper or card. In one particularly preferred embodiment the substrates comprise plastics, particularly PVC. In another preferred embodiment, the substrates comprise cork.

Following the conventional linguistic usage, plastics in the context of the present patent application refer to organic, polymeric solids. The plastics are typically divided into three major groups, namely into thermoplastics, thermosets, and elastomers. "Plastics" is a generic term in common usage for synthetic polymeric materials. Conventionally, plastics are produced synthetically or semisynthetically from monomeric organic molecules or biopolymers.

Suitable substrates for the coating compounds of the invention are, for example, thermoplastic polymers, especially polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers, or mixtures thereof.

Mention may further be made of polyethylene, polypropylene, polystyrene, polybutadiene, polyesters, polyamides, polyethers, polycarbonate, polyvinylacetal, polyacrylonitrile, polyacetal, polyvinyl alcohol, polyvinyl acetate, phenolic resins, urea resins, melamine resins, alkyd resins, epoxy resins or polyurethanes, their block or graft copolymers, and blends thereof.

The following plastics may be stated as being plastics of preferred suitability: acrylonitrile-butadiene-styrene (ABS), polyacrylonitrile/methyl methacrylate (AMMA), acrylonitrile-styrene-acrylate (ASA), epoxy resins (EP), expanded polystyrene (EPS), ethylene-vinyl acetate copolymer (EVA), high density polyethylene (HDPE), low density polyethylene (LDPE), methyl meth-acrylate/acrylonitrile/butadiene/styrene (MABS), methyl acrylate/butadiene/styrene copolymer (MBS), melamine-formaldehyde resin (MF), polyamide (PA), nylon (PA6), nylon (PA66), polyacrylonitrile (PAN), 1,2-polybutadiene (PB), polybutylene terephthalate (PBT), polycarbonate (PC), polyethylene (PE), chlorinated polyethylene (PEC), polyetheretherketone (PEEK), polyetherimide (PEI), polyetherketone (PEK), polyarylethersulfone (PES), polyethylene terephthalate (PET), phenol-formaldehyde resin (PF), polyimide (PD, polyisobutylene (PIB), polymethyl meth-acrylate (PMMA), polyoxymethylene (POM), polypropylene (PP), polyethylene sulfide (PPS), polystyrene (PS), polysulfone (PSU), polyurethane (PUR), polyvinyl acetate (PVAC), polyvinyl alcohol (PVAL), polyvinyl chloride (PVC), polyvinylidene chloride (PVDC), styene-acrylonitrile (SAN), styrene-butadiene (SB), urea-formaldehyde resin (UF), unsaturated polyester resin UP plastics (abbreviated codes as per DIN 7728), and aliphatic polyketones.

Particularly preferred substrates are polyolefins, such as, for example, PP (polypropylene), which alternatively may be isotactic, syndiotactic or atactic and alternatively unoriented or oriented by uniaxial or biaxial drawing, SAN (styrene-acrylonitrile copolymers), PC (polycarbonates), PVC (polyvinyl chlorides), PMMA (polymethyl methacrylates), PBT (poly(butylene terephthalates)), PA (polyamides), ASA (acrylonitrile-styrene-acrylate copolymers), and ABS (acrylonitrile-butadiene-styrene copolymers), and also their physical mixtures (blends). Particularly preferred are PP, SAN, ABS, ASA, and also blends of ABS or ASA with PA or PBT or PC.

A further subject of the invention is the use of coating compounds comprising one or more compositions (I) to coat the surfaces of solid substrates. In this case there is no limitation on the nature of the substrate per se. In one particularly preferred embodiment, the substrates in question are plastics, which are subject to the statements made above.

The term "coating compounds" encompasses any kind of compositions which is applied to the surface of a substrate to be coated and is subsequently cured, optionally after drying beforehand. In particular, the term "coating compounds" includes all kinds of surface-coating material.

In this context, as the skilled person is aware, a "surface-coating material" is a coating compound which may be liquid or else in powder form and which is applied thinly in a thin film to an article, viz the substrate to be coated, and then is cured. Compare in this regard also the section below concerning the term "coating".

The coating compounds of the invention may comprise, additionally to the compositions (I), other additives typical of surface coatings, examples being antioxidants, stabilizers, activators (accelerators), fillers, pigments, dyes, antistatic agents, flame retardants, thickeners, thixotropic agents, surface-active agents, viscosity modifiers, plasticizers or chelating agents. Moreover, the coating compounds of the invention, besides the compounds (I), may also comprise further radiation-curable components which are not encompassed by the formula (I).

Thickeners contemplated include not only radically (co) polymerized (co)polymers but also customary organic and inorganic thickeners such as hydroxymethylcellulose or bentonite.

Examples of chelating agents which can be used include ethylenediamineacetic acid and the salts thereof, and also β-diketones.

Suitable fillers comprise silicates, examples being silicates obtainable by hydrolysis of silicon tetrachloride, such as Aerosil® from Evonik, siliceous earth, talk, aluminum silicates, magnesium silicates, calcium carbonates, etc.

Suitable stabilizers comprise typical UV absorbers such as oxanilides, triazines, and benzotriazole (the latter available as Tinuvin® products from BASF SE), and benzophenones. They may be used alone or together with suitable radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacinate. Stabilizers are used customarily in amounts of 0.1 to 5.0 wt %, based on the solid components comprised in the preparation.

Pigments may likewise be comprised in the coating compounds. Pigments, according to CD Römpp Chemie Lexikon—Version 1.0, Stuttgart/New York: Georg Thieme Verlag 1995, with reference to DIN 55943, are particulate "colorants that are organic or inorganic, chromatic or achromatic, and are virtually insoluble in the application medium". Virtually insoluble here means a solubility at 25° C. of below 1 g/1000 g of application medium, preferably below 0.5, more preferably below 0.25, very preferably below 0.1, and more particularly below 0.05 g/1000 g application medium.

If a pigment is used, it should be ensured either that curing is carried out with electron beams or that a photoinitiator is used which in spite of the pigmentation can be activated by the incoming radiation—for example, by the photoinitiator having significant absorption in a wavelength range in which the pigment transmits the incoming radiation to a sufficient extent. A preferred embodiment of the present invention is not to use any pigment and for the coating compound to be used in clear surface-coating materials.

Examples of pigments encompass any desired systems of absorption pigments and/or effect pigments, preferably absorption pigments. The number and selection of the pigment components are not subject here to any limitations whatsoever. They may be adapted as desired to the particular requirements—for example, the desired color conveyed.

Effect pigments are all pigments which show a platelet-shaped construction and endow a surface coating with specific decorative color effects. The effect pigments, for example, are all of the effect-imparting pigments which can customarily be used in vehicle finishing and industrial coating. Examples of such effect pigments are pure metallic pigments, such as aluminum, iron or copper pigments; interference pigments, such as, for example, titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments which can be used in the surface-coatings industry. Examples of organic absorption pigments are azopigments, phthalocyanine, quinacridone, and pyrrolopyrrole pigments. Examples of inorganic absorption pigments are iron oxide pigments, titanium dioxide, and carbon black.

Where the coating compounds are cured not with electron beams but instead by UV radiation, there is preferably at least one photoinitiator included which is able to initiate the polymerization of ethylenically unsaturated double bonds (C=C double bonds).

Very generally, it is possible to use all photoinitiators known in this context to the skilled person, of the kind described for example in relevant technical publications and monographs.

Examples of those contemplated include the following:
mono- or bisacylphosphine oxides, for instance 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenones, hydroxyacetophenones, phenylglyoxylic acid and its derivatives, or mixtures of these photoinitiators. Examples include the following: benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxy-acetophenone, β-methylanthraquinone, tert-butylanthraquinone, anthraquinonecarboxylic esters, benzaldehyde, α-tetralone, 9-acetylphenanthrene, 2-acetylphenanthrene, 10-thio-xanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethyl-thioxanthone, 2,4-diisopropyl thioxanthone, 2,4-dichlorothioxanthone, benzoin, benzoin iso-butyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloro-acetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloro-anthraquinone, 2-amylanthraquinone, and 2,3-butanedione.

Also suitable are nonyellowing or low-yellowing photoinitiators of the phenylglyoxalic ester type.

Mixtures of different photoinitiators can also be used. Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone, or 2,4,6-trimethylbenzophenone and 4-methylbenzophenone and 2,4,6-trimethylbenzoyldiphenylphosphine oxide.

Preferred photoinitiators are:
2,4,6-trimethylbenzoyldiphenylphosphine oxide,
ethyl 2,4,6-trimethylbenzoylphenylphosphinate,
bis(2,4,6-trimethylbenzoyl)phenylphosphine oxide,
benzophenone,
1-benzoylcyclohexan-1-ol,
2-hydroxy-2,2-dimethylacetophenone, and
2,2-dimethoxy-2-phenylacetophenone.

The coating compounds comprise the photoinitiators preferably in an amount of 0.05 to 10 wt %, more preferably 0.1 to 8 wt %, more particularly 0.2 to 5 wt %, based on the total amount of the curable components present in the coating compounds.

The surfaces of solid substrates are coated with the compositions (I) for use in accordance with the invention according to customary methods known to the skilled person, where the desired compositions (I), or a coating compound which comprises one or more compositions (I), are or is applied in the desired thickness to the substrate and at least partly radiation-cured. Complete radiation curing is preferred here. This procedure may if desired be repeated one or more times. Application to the substrate may take place in a known way, as for example by spraying, troweling, knifecoating, brushing, rolling, roll coating, pouring, laminating, in-mold coating or coextruding, preferably by spraying and roll coating. Spraying methods employable include, for example, air-pressure spraying, airless spraying or electrostatic spraying techniques.

As the skilled person is aware, radiation curing is the radical polymerization of polymerizable compounds that is induced by electromagnetic and/or particulate radiation. The use of UV light or electron beams (electronic radiation; 150 to 300 keV) is preferred. Particularly preferred is UV light in the wavelength range from 200 to 500 nm and especially from 250 to 400 nm.

The coating thickness is preferably set such that the dry film thickness is in the range from 5 to 200 μm, and preferably in the range of 5-150 μm. As the skilled person knows, dry film thickness refers to the film thickness of a dried or cured coating. The concept of drying here includes the evaporation of solvents present in a coating compound, such as water or organic solvents. The concept of curing here includes the crosslinking of the coating compound. It may be especially emphasized that the concept of the dry film thickness here is to be understood, purely on a phenomenological basis, as the layer thickness possessed by a dried and/or cured coating.

The radiation curing may if desired take place at relatively high temperatures. Preferred in that case is a temperature above the $T_g$ of the radiation-curable binder ($T_g$=glass transition temperature).

The radiation curing may take place under an oxygen-containing atmosphere or under inert gas, the latter being preferred.

Besides radiation curing, there may be other curing mechanisms involved as well, as for example thermal, moisture, chemical and/or oxidative curing.

If two or more layers of the coating material are applied one above another, it is possible optionally for drying and/or radiation curing to take place after each coating operation.

Examples of suitable radiation sources for the radiation curing are low-pressure, medium-pressure, and high-pressure mercury emitters, and also fluorescent tubes, pulsed emitters, metal halide lamps, lasers, pulsed lamps (flash light), halogen lamps, and electronic flash devices, enabling radiation curing to take place without photoinitiator, or excimer emitters.

Two or more radiation sources may also be used for the radiation curing—two to four, for example. These sources may if desired also emit each in different wavelength ranges.

The irradiation may optionally also be carried out in the absence of oxygen, such as under an inert gas atmosphere, for example. Suitable inert gases are preferably nitrogen, noble gases, carbon dioxide, or combustion gases.

A further subject of the invention in accordance with the statements made above is a method for coating the surfaces of solid substrates by applying compositions (I) or coating compounds comprising one or more compositions (I) to the surface of a solid substrate and then carrying out radiation curing, particularly by means of UV light.

"Coating" refers to techniques which serve for application of a firmly adhering layer to the surface of a workpiece—the substrate. The layer applied is referred to as a coating. The customary coating processes differ in the way in which the coating compounds are applied, being differentiated as chemical, mechanical, thermal and thermomechanical processes. Preferred in the context of the present invention is UV curing, which induces chemical crosslinking of the compositions (II) and/or the compositions (I) included in the coating compounds.

EXAMPLES

Abbreviations

M=mean molar weight
FN=OH functionality
OHN=OH number (hydroxyl number)
Substances Used
Lupraphen® 3904/1: Polyester polyol; M=540 g/mol; FN=3.7; OHN=365-400 mg KOH/g; commercial product from BASF SE
Lupraphen® 6800/2: Polyester polyol; M=1000 g/mol; FN=2; OHN=108-116 mg KOH/g; commercial product from BASF SE
Lupraphen® 1619/1: Polyester polyol; M=2000 g/mol; FN=2; OHN=53-59 mg KOH/g; commercial product from BASF SE Lupraphen® 7900/1: Polyester polyol; M=530 g/mol; FN=3, 2; OHN=320-360 mg KOH/g; commercial product from BASF SE Lupranol 7500/1: Polyether polyol; M=278 g/mol; FN=3; OHN=605 mg KOH/g; commercial product from BASF SE Polyester polyol B: M=1000 g/mol; FN=2; OHN=100-110 mg KOH/g. The polyester diol B was prepared as follows: 547.2 g of adipic acid were introduced as an initial charge together with 622 g of isophthalic acid and 1600.7 g of butylethylpropane diol and this initial charge was heated. At a temperature of 180° C., 110 mg of titanium tetrabutoxide were added as catalyst. The esterification took place first for about 5 h under atmospheric pressure and subsequently for a further 5 h with a simultaneous ramped reduction in the pressure to 60 mbar at 200-240° C. with distillative removal of the water of reaction. The progress of the reaction was monitored from the amount of distillate and the acid number of the reaction mixture. Target acid number: <1.0 mg KOH/g.

Laromer® DPGDA: Dipropylene glycol diacrylate; commercial product from BASF SE

Glycidether 162: Pentaerythritol triglycidyl ether; commercial product from BASF SE Grilonit® RV 1806: 1,4-Butanediol diglycidyl ether; commercial product from EMS-Chemie AG Kerobit® TBK (BASF SE)/Vulkanox® BHT (LANXESS GmbH): 2,6-Di-tert-butyl-p-cresol.

INVENTIVE EXAMPLES

Example 1

258.51 g of Lupraphen 3904/1, 504.19 g of Polyester polyol B, 30.38 g of phthalic anhydride and 219.04 g of Laromer DPGDA were introduced as an initial charge together with 206.92 g of acrylic acid, 1.27 g of Kerobit TBK, 3 g of 4-methoxyphenol, 0.1 g of phenothiazine and 4 g of hypophosphorous acid in 333.33 g of methylcyclohexane and this initial charge was heated to 100-110° C. On attainment of the reaction temperature, 5 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 22.5 g of tetrabutylammonium bromide and 113.3 g of Glycidether 162 were added. The reaction of the epoxide with the acrylic acid was carried out at temperatures between 105 and 108° C. to an acid number <5 mg KOH/g.

Example 2

310.21 g of Lupraphen 3904/1, 605.03 g of Polyester polyol B and 36.46 g of phthalic anhydride were introduced as an initial charge together with 248.31 g of acrylic acid, 1.52 g of Kerobit TBK, 3.6 g of 4-methoxyphenol, 0.12 g of phenothiazine and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 143.8 g of Glycidether 162 were added. The reaction of the epoxide with the acrylic acid was carried out at temperatures between 105 and 108° C. to an acid number <5 mg KOH/g.

Example 3

310.21 g of Lupraphen 3904/1, 605.03 g of Polyester polyol B and 36.46 g of phthalic anhydride were introduced as an initial charge together with 248.31 g of acrylic acid, 1.52 g of Kerobit TBK, 3.6 g of 4-methoxyphenol, 0.12 g of phenothiazine and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 143.8 g of Glycidether 162 were added. The reaction of the epoxide with the acrylic acid was carried out at temperatures between 105 and 108° C. to an acid number <5 mg KOH/g. 262 g of DPGDA were added to the finished product.

COMPARATIVE EXAMPLES

Comparative Example 1

318.22 g of Lupraphen 3904/1, 589.65 g of Lupraphen 6800/2 and 37.4 g of phthalic anhydride were introduced as an initial charge together with 254.73 g of acrylic acid, 1.2 g of Kerobit TBK, 3.6 g of 4-methoxyphenol, 0.04 g of phenothiazine, 1.2 g of triphenyl phosphite and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 140.11 g of Glycidether 162 were added. The reaction of the epoxide with the acrylic acid was carried out at temperatures between 105 and 108° C. to an acid number <5 mg KOH/g. 268 g of Laromer DPGDA were added to the finished product.

Comparative Example 2

493.91 g of Lupraphen 3904/1, 378.64 g of Lupraphen 1619/1 and 41.92 g of phthalic anhydride were introduced as an initial charge together with 285.53 g of acrylic acid, 1.2 g of Kerobit TBK, 3.6 g of 4-methoxyphenol, 0.04 g of phenothiazine, 1.2 g of triphenyl phosphite and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 137.34 g of Glycidether 162 were added. The reaction of the epoxides with the acrylic acid was carried out at temperatures between 105 and 108° C. to an acid number <5 mg KOH/g. 270.5 g of Laromer DPGDA were added to the finished product.

Comparative Example 3

411.02 g of Lupraphen 3904/1, 500.44 g of Lupraphen 1619/1 and 36.94 g of phthalic anhydride were introduced as an initial charge together with 251.59 g of acrylic acid, 1.2 g of Kerobit TBK, 3.6 g of 4-methoxyphenol, 0.04 g of phenothiazine, 1.2 g of triphenyl phosphite and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 302.93 g of Glycidether 162 were added. The reaction of the epoxides with the acrylic acid was carried out at temperatures between 105 and 108° C. to an acid number <5 mg KOH/g. 320 g of Laromer DPGDA were added to the finished product.

Comparative Example 4

752.52 g of Lupraphen 3904/1 were introduced as an initial charge together with 447.48 g of acrylic acid, 1.2 g of Kerobit TBK, 3.6 g of 4-methoxyphenol, 0.04 g of phenothiazine, and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and a mixture of 95.2 g of Glycidether 162 and 75.37 g of Grilonit RV 1806 were added. The reaction of the epoxides with the acrylic acid was carried out at temperatures between 105 and 108° C. to an acid number <5 mg KOH/g. 281 g of Laromer DPGDA were added to the finished product.

Comparative Example 5

752.18 g of Lupraphen 3904/1 and 37.82 g of phthalic anhydride were introduced as an initial charge together with 410 g of acrylic acid, 1.2 g of Kerobit TBK, 3.6 g of 4-methoxyphenol, 0.04 g of phenothiazine, and 1.2 g of hypophosphorous acid in 400 g of methylcyclohexane and this initial charge was heated to 100-110° C. On attainment of the reaction temperature, 6 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 27 g of tetrabutylammonium bromide and 182.15 g of Glycidether 162 were added. The reaction of the epoxides with the acrylic acid was carried out at temperatures between 105 and 108° C. to an acid number <5 mg KOH/g. 282 g of Laromer DPGDA were added to the finished product.

Comparative Example 6

835.06 g of Lupraphen 7900/1 were introduced as an initial charge together with 382.94 g of acrylic acid, 3.08 g of 4-methoxyphenol, 0.03 g of phenothiazine and 1.03 g of Kerobit TBK, in 340 g of methylcyclohexane and this initial charge was heated to 100-110° C. On attainment of the reaction temperature, 3 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 5.6 g of dimethylethanolamine, 1.23 g of thiodiglycol and 134.11 g of Glycidether 162 were added. The reaction of the epoxides with the acrylic acid was carried out at temperatures between 105 and 108° C. to an acid number <5 mg KOH/g.

Comparative Example 7

597.1 g of Lupranol 7500/1 were introduced as an initial charge together with 602.9 g of acrylic acid, 1.2 g of Kerobit TBK, 3.6 g of 4-methoxyphenol, 0.04 g of phenothiazine, 1.2 g of triphenyl phosphite and 1.2 g of hypophosphorous acid, in 400 g of methylcyclohexane and this initial charge was heated to 100-110° C. On attainment of the reaction temperature, 3 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 30 g of tetrabutylammonium bromide and 826.14 g of Epikote 828 were added. The reaction of the epoxides with the acrylic acid was carried out at temperatures between 105 and 108° C. to an acid number <5 mg KOH/g.

Comparative Example 8

688 g of Lupranol 7500/1 were introduced as an initial charge together with 279.6 g of adipic acid, 293 g of acrylic acid, 1.2 g of Kerobit TBK, 2.8 g of 4-methoxyphenol, 0.09 g of phenothiazine, and 2.7 g of hypophosphorous acid, in 320 g of methylcyclohexane and this initial charge was heated to 100-110° C. On attainment of the reaction temperature, 6.9 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 34.5 g of tetrabutylammonium bromide and 61.2 g of Glycidether 162 were added. The reaction of the epoxides with the acrylic acid was carried out at temperatures between 105 and 108° C. to an acid number <5 mg KOH/g.

Comparative Example 9

597.1 g of Lupranol 7500/1 were introduced as an initial charge together with 138.3 g of adipic acid, 192.3 g of acrylic acid, 0.6 g of Kerobit TBK, 1.8 g of 4-methoxyphenol, 0.02 g of phenothiazine, 0.6 g of triphenyl phosphite and 0.6 g of hypophosphorous acid, in 200 g of methylcyclohexane and this initial charge was heated to 100-110° C. On attainment of the reaction temperature, 3 g of sulfuric acid were added. The progress of the azeotropic esterification was monitored via the amount of water removed. On attainment of the amount of water corresponding to the target conversion, the acid number was determined and, if necessary, made up to the desired value by addition of acrylic acid. Then 11.3 g of tributylamine and 79.83 g of Epikote 828 were added. The reaction of the epoxides with the acrylic acid was carried out at temperatures between 105 and 108° C. to an acid number <5 mg KOH/g.

Performance Investigations

PVC was coated with the substances produced according to the above inventive and comparative examples, the coating procedure being as follows:

The resins were formulated as follows: 100 g of the resin was adjusted by addition of Laromer DPGDA (i.e., reactive diluent) to a processing viscosity of 800 mPas and admixed with 4.2 wt % (based on the overall formulation) of Irgacure 500 (i.e., photoinitiator).

Curing: The UV curing took place by irradiation in an IST UV unit on a conveyor belt at 5 m/min with 1 UV lamp (200 W/cm, medium-pressure mercury lamp, power 50%, dose 1500-1750 mJ/cm$^2$).

This was followed by evaluation of the flexibility (flexural test) and the chemical resistance in relation to iodine, potassium permanganate, eosin, and a commercial marker pen (BIC Onyx). The results are set out in table 1 below.

The Test Methods in Detail:

Flexural Test:

Table 1 reports the number of cracks. The test was carried out as follows: The formulated coating material was applied using a four-way bar applicator in a film thickness of 12-15 μm to the PVC substrate, and was cured as described above. The substrate was subsequently bent at an angle of 360° and the number of cracks appearing was assessed.

Chemical Resistance to Iodine (1% in Ethanol):

Table 1 reports a value on a rating-like scale from −3 to +3. On this scale, a value of 0 represents a result corresponding to a customary industry standard. Values of −3 are very poor. Values of +3 are excellent. The test was carried out as follows: The coating material was applied using a four-way bar applicator in a film thickness of 12-15 μm to the substrate, and was cured as described above. Then a pad impregnated with 1% strength ethanolic iodine solution was placed on and covered with a glass. After 20 minutes, glass and pad were removed, the test area was carefully cleaned with a cloth and water, and the discoloration was directly assessed optically.

Chemical Resistance to KMnO$_4$ (1% in Water):

Table 1 reports a value on a rating-like scale from −3 to +3. On this scale, a value of 0 represents a result corresponding to a customary industry standard. Values of −3 are very poor. Values of +3 are excellent. The test was carried out as follows: The coating material was applied using a four-way bar applicator in a film thickness of 12-15 μm to the substrate, and was cured as described above. Then a pad impregnated with 1% strength aqueous KMnO$_4$ solution was placed on and covered with a glass. After 20 minutes, glass and pad were removed, the test area was carefully cleaned with a cloth and water, and the discoloration was directly assessed optically.

Chemical Resistance to Eosin (2% in Ethanol):

Table 1 reports a value on a rating-like scale from −3 to +3. On this scale, a value of 0 represents a result corresponding to a customary industry standard. Values of −3 are very poor. Values of +3 are excellent. The test was carried out as follows: The coating material was applied using a four-way bar applicator in a film thickness of 12-15 μm to the substrate, and was cured as described above. Then a pad impregnated with 2% strength ethanolic eosin solution was placed on and covered with a glass. After 20 minutes, glass and pad were removed, the test area was carefully cleaned with a cloth and water, and the discoloration was directly assessed optically.

Chemical Resistance to BIC Onyx:

Table 1 reports a value on a rating-like scale from −3 to +3. On this scale, a value of 0 represents a result corresponding to a customary industry standard. Values of −3 are very poor. Values of +3 are excellent. The test was carried out as follows: The coating material was applied using a four-way bar applicator in a film thickness of 12-15 μm to the substrate, and was cured as described above. Then ten back-and-forth strokes were performed on the test area using an Onyx text marker from BIC; the test area was carefully cleaned with a cloth and water, and the discoloration was directly assessed optically.

TABLE 1

Results of the performance investigations

| | Flexural test | Iodine test | $KMnO_4$ test | Eosin test | BIC Onyx test |
|---|---|---|---|---|---|
| Example 1 | no cracks | 0 | +3 | 0 | −1 |
| Example 2 | no cracks | +1 | +3 | +1 | 0 |
| Example 3 | no cracks | 0 | +3 | 0 | −1 |
| Comparative 1 | no cracks | −3 | −2 | 0 | −3 |
| Comparative 2 | few cracks | −1 | 0 | 0 | −3 |
| Comparative 3 | some cracks | 0 | −1 | 0 | −2 |
| Comparative 4 | many cracks | 0 | 0 | 0 | −1 |
| Comparative 5 | many cracks | 0 | +1 | 0 | −1 |
| Comparative 6 | some cracks | −2 | 0 | 0 | −1 |
| Comparative 7 | many cracks | 0 | 0 | 0 | 0 |
| Comparative 8 | few cracks | −2 | −3 | −1 | −1 |
| Comparative 9 | some cracks | −2 | −3 | −1 | +2 |

The invention claimed is:

1. A radiation-curable, polyester acrylate-containing composition (I) obtainable by reacting
   0.5 to 20 mol % of at least one polyester polyol (A), prepared by reaction of the reactants adipic acid, phthalic anhydride, oleic acid and trimethylolpropane, where the polyester polyol has an OH functionality in the range from 3.0 to 3.9, and
   0.5 to 30 mol % of at least one polyester diol (B), prepared by reaction of the reactants adipic acid, isophthalic acid, and 2-butyl-2-ethyl-1,3-propanediol,
in the presence of an acidic esterification catalyst and in the presence of at least one hydrocarbon (L) which functions as solvent and forms an azeotropic mixture with water, and also in the presence of at least one polymerization inhibitor, with azeotropic removal of water formed in the reaction, at temperatures in the range from 60 to 140° C., with
   1 to 10 mol % of phthalic anhydride (C) and
   65 to 75 mol % of (meth)acrylic acid (D)
in an esterification removing the hydrocarbon (L) distillatively after the esterification, and, after neutralization of the esterification catalyst, reacting free (meth)acrylic acid with an epoxide compound (E) in an amount equivalent to the acid number of the reaction mixture, the compound (E) having at least two epoxide groups per molecule, reaction taking place to an acid number of 5 or fewer mg KOH/g, wherein:
   the mol % figures are based on the total amount of the compounds (A), (B), (C) and (D) used for the reaction; and
   the molar ratio of the compounds (A) and (B) is in the range from 10:1 to 1:40.

2. A radiation-curable composition (II) comprising 60 to 100 wt % of a polyester acrylate-containing composition (I) according to claim 1 and 0 to 40 wt % of dipropylene glycol di-acrylate (F)—wt % based in each case on the overall radiation-curable composition (II).

3. A coating compound comprising one or more than one composition (I) according to claim 1.

4. A coating compound comprising one or more than one composition (II) according to claim 2.

5. A method of coating solid substrates, the method comprising using the composition (I) according to claim 1 to coat solid substrates.

6. The method according to claim 5, wherein the solid substrates comprise PVC.

7. The method according to claim 5, wherein the solid substrates comprise cork.

8. A method of coating solid substrates, the method comprising using the composition (II) according to claim 2 to coat solid substrates.

9. The method according to claim 8, wherein the solid substrates comprise PVC.

10. The method according to claim 8, wherein the solid substrates comprise cork.

* * * * *